(12) United States Patent
Soltani et al.

(10) Patent No.: US 11,900,515 B2
(45) Date of Patent: *Feb. 13, 2024

(54) AUTOMATIC AREA DETECTION

(71) Applicant: Procore Technologies, Inc., Carpinteria, CA (US)

(72) Inventors: Mohammad Soltani, North York (CA); Farid Mirahadi, North York (CA); Azadeh Yazdanpanah, Richmond Hill (CA); Fiona Liu, North York (CA)

(73) Assignee: Procore Technologies, Inc., Carpinteria, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/883,555

(22) Filed: Aug. 8, 2022

(65) Prior Publication Data
US 2023/0222715 A1 Jul. 13, 2023

Related U.S. Application Data

(63) Continuation of application No. 17/499,772, filed on Oct. 12, 2021, now Pat. No. 11,410,362.

(51) Int. Cl.
  *G09G 5/00* (2006.01)
  *G06T 11/60* (2006.01)
  *G06T 11/20* (2006.01)
(52) U.S. Cl.
  CPC ............ *G06T 11/60* (2013.01); *G06T 11/203* (2013.01)
(58) Field of Classification Search
  CPC ................. G09G 5/14; G09G 2340/10; G09G 2340/125; G06T 11/60; G06T 15/503
  (Continued)

(56) References Cited

U.S. PATENT DOCUMENTS 10,715,793 B1 7/2020 Rabin et al.
2018/0075168 A1* 3/2018 Tiwari ................. H04N 23/698
(Continued)

OTHER PUBLICATIONS

Dosch, Philippe et al., "A Complete System for the Analysis of Architectural Drawings." International Journal on Document Analysis and Recognition, vol. 3(2), Dec. 2000, pp. 1-18.
(Continued)

*Primary Examiner* — Gordon G Liu
(74) *Attorney, Agent, or Firm* — Lee Sullivan Shea & Smith LLP

(57) ABSTRACT

An example computing platform is configured to (i) receive a two-dimensional (2D) image file comprising a construction drawing, (ii) generate, via semantic segmentation, a first set of polygons corresponding to respective areas of the 2D image file, (iii) generate, via instance segmentation, a second set of polygons corresponding to respective areas of the 2D image file, (iv) generate, via unsupervised image processing, a third set of polygons corresponding to respective areas of the 2D image file, (v) based on (a) overlap between polygons in the first, second, and third sets of polygons and (b) respective confidence scores for each of the overlapping polygons, determine a set of merged polygons corresponding to respective areas of the 2D image file, and (vi) cause a client station to display a visual representation of the 2D image file where each merged polygon is overlaid as a respective selectable region of the 2D image file.

20 Claims, 10 Drawing Sheets
(6 of 10 Drawing Sheet(s) Filed in Color)

(58) Field of Classification Search
USPC .......................................................... 345/629
See application file for complete search history.

(56) References Cited

U.S. PATENT DOCUMENTS

| | | |
|---|---|---|
| 2019/0279032 A1 | 9/2019 | Tang et al. |
| 2020/0388001 A1 | 12/2020 | Lee |
| 2021/0142564 A1* | 5/2021 | Impas .................. G06T 15/506 |

OTHER PUBLICATIONS

Mace, Sébastien et al., "A System to Detect Rooms in Architectural Floor Plan Images." Proceedings of the 9th IAPR International Workshop on Document Analysis Systems, Jun. 2010, 9 pages.

Ahmed, Sheraz et al., "Improved Automatic Analysis of Architectural Floor Plans", 2011 International Conference on Document Analysis and Recognition, IEEE, 2011, pp. 864-869.

De Las Heras, Lluis-Pere et al., "Unsupervised Wall Detector in Architectural Floor Plans", 2013 12th International Conference on Document Analysis and Recognition, 2013, 5 pages.

De Las Heras, Lluis-Pere et al., "Statistical Segmentation and Structural Recognition for FloorPlan Interpretation", Notation Invariant Structural Element Recognition, International Journal on Document Analysis and Recognition (IJDAR), 2014, pp. 1-18.

Vargas, Cabrera et al., "Wall Extraction and Room Detection for Multi-unit Architectural Floor Plans", A Thesis Submitted in Partial Fulfillment of the Requirements for the Degree of Master of Science in the Department of Computer Science, University of Victoria, 2018, 98 pages.

Dodge, Samuel et al., "Parsing Floor Plan Images", 15th International Conference on Machine Vision Applications (MVA), IEEE, May 8-12, 2017, pp. 332-335.

Kalervo, Ahti, "Automatic Floorplan Analysis, CubiCasa5K Dataset and an Improved Multi-Task Model for Floorplan Image Analysis", Thesis submitted in partial fulfillment of the requirements for the degree of Master of Science in Technology, Otaniemi, Nov. 25, 2019, 68 pages.

Kalervo, Ahti et al., "Cubicasa5k: A Dataset and an Improved Multi-task Model for Floorplan Image Analysis." Scandinavian Conference on Image Analysis, arXiv:1904.01920v1 [cs.CV] Apr. 3, 2019, pp. 1-12.

Zeng, Zhilang et al., "Deep Floor Plan Recognition Using a Multi-Task Network with Room-Boundary-Guided Attention" In Proceedings of the IEEE/CVF International Conference on Computer Vision, 2019. pp. 9096-9104.

Sandelin, Fredrik, "Semantic and Instance Segmentation of Room Features in Floor Plans Using Mask R-CNN", Department of Information Technology, Uppsala Universitet, Aug. 2019, 55 pages.

Egiazarian, Vage et al., "Deep Vectorization of Technical Drawings." European Conference on Computer Vision. Springer, Cham, arXiv:2003.05471v3 [cs.CV], Jul. 30, 2020, 41 pages.

Liu, Chen et al., "Raster-to-Vector: Revisiting Floorplan Transformation", Proceedings of the IEEE International Conference on Computer Vision, 2017, pp. 2195-2203.

Liu, Chen et al., "Raster-to-Vector: Revisiting Floorplan Transformation, Supplementary Material", ICCV, 2017, 10 pages.

Zhang, Yuli et al., "The Direction-Aware, Learnable, Additive Kernels and the Adversarial Network for Deep Floor Plan Recognition", arXiv preprint arXiv:2001.11194v1 [cs.CV], Jan. 30, 2020, 10 pages.

Jang, Hanme et al., "Indoor Reconstruction from Floorplan Images With a Deep Learning Approach", ISPRS International Journal of Geo-Information, vol. 9(2), Jan. 21, 2020, 15 pages.

Lu, Yueheng et al., "CubiGraph5K-Organizational Graph Generation for Structured Architectural Floor Plan Dataset", Proceedings of the 26th International Conference of the Association for Computer-Aided Architectural Design Research in Asia (CAADRIA), vol. 1, 2021, pp. 81-90.

Song, Jaeyoung et al., "Framework for Indoor Elements Classification via Inductive Learning on Floor Plan Graphs", ISPRS International Journal of Geo-Information, vol. 10(2), Feb. 22, 2021, pp. 1-17.

Radne, Alexander et al., "Vectorization of Architectural Floor Plans", PixMax—A Semi-Supervised Approach to Domain Adaptation Through Pseudolabelling, Master's Thesis in Complex Adaptive Systems, Department of Electrical Engineering, Chalmers University of Technology, Gothenburg, Sweden, 2021, 86 pages.

Caudron, Quentin et al., "Extract Floor Plan Images from PDF Brochures", pp. 1-3 [online], [retrieved on Nov. 3, 2021]. Retrieved from the Internet <URL:https://github.com/QCaudron/boopnet.

Ravagli, Jason et al., "Text Recognition and Classification in Floor Plan Images." 2019 International Conference on Document Analysis and Recognition Workshops (ICDARW). vol. 1. IEEE, 2019, 6 pages.

Dong, Shuai et al., "Vectorization of Floor Plans Based on EdgeGAN." Information, vol. 12(5), https://doi.org/10.3390/info12050206, May 12, 2021, pp. 1-16.

Santosh, K.C. et al., "Graphical Symbol Recognition", Encyclopedia of Electrical and Electronics Engineering, https://hal.archives-ouvertes.fr/hal-01166512, Jun. 23, 2015, 37 pages.

Ziran, Zahra et al., "Object Detection in Floor Plan Images." IAPR Workshop on Artificial Neural Networks in Pattern Recognition. Springer Nature, DOI: 10.1007/978-3-319-99978-4_30, Sep. 2018, 13 pages.

Goyal, Shreya et al., "BRIDGE: Building Plan Repository for Image Description Generation, and Evaluation", 2019 International Conference on Document Analysis and Recognition (ICDAR), 2019, pp. 1071-1076.

Rezvanifar, Alireza et al., "Symbol Spotting on Digital Architectural Floor Plans Using a Deep Learning-based Framework", Proceedings of the IEEE/CVF Conference on Computer Vision and Pattern Recognition Workshops, 2020, 10 pages.

Fan, Zhiwen et al., "FloorPlanCAD: A Large-Scale CAD Drawing Dataset for Panoptic Symbol Spotting," arXiv:2105.07147v1 [cs.CV], May 15, 2021, 17 pages.

Or, Siu-hang et al., "Highly Automatic Approach to Architectural Floorplan Image Understanding & Model Generation", Pattern Recognition, Nov. 16-18, 2005, 9 pages.

Yin, Xuetao et al., "Generating 3D Building Models from Architectural Drawings: A Survey", IEEE Computer Society, Jan./Feb. 2009, pp. 20-30.

Yetis, Gizem, "Auto-Conversion From 2D Drawing to 3D Model with Deep Learning", A Thesis Submitted to The Graduate School of Natural and Applied Sciences of Middle East Technical University, Sep. 2019, 168 pages.

Yang, Bin et al., "Semiautomatic Structural BIM-Model Generation Methodology Using CAD Construction Drawings", Journal of Computing in Civil Engineering, May 2020, pp. 1-17.

Byun, Youngsoo, et al., "ABGS: A System for the Automatic Generation of Building Information Models from Two-Dimensional CAD Drawings", Sustainability, vol. 12, doi:10.3390/su12176713, Aug. 19, 2020, pp. 1-19.

Mewada, Hiren K. et al., "Automatic Room Information Retrieval and Classification From Floor Plan Using Linear Regression Model", International Journal on Document Analysis and Recognition (IJDAR), https://doi.org/10.1007/s10032-020-00357-x, Jul. 30, 2020, 14 pages.

Surikov, Ilya Y. et al., "Floor Plan Recognition and Vectorization Using Combination UNet, Faster-RCNN, Statistical Component Analysis and Ramer-Douglas-Peucker", International Conference on Computing Science, Communication and Security, 2020, pp. 16-28.

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

International Searching Authority, PCT International Search Report and Written Opinion, PCT International Application No. PCT/US2022/046441, dated Feb. 17, 2023, 12 pages.

* cited by examiner

AUTOMATIC AREA DETECTION

CROSS-REFERENCE TO RELATED APPLICATION

This application claims the benefit of priority under 35 U.S.C. § 120 to U.S. application Ser. No. 17/499,772, filed on Oct. 12, 2021 and titled "Automatic Area Detection," the contents of which are incorporated by reference herein in their entirety.

BACKGROUND

Construction projects are often complex endeavors involving the coordination of many professionals across several discrete phases. At the inception of a construction project, an owner may coordinate with planners, architects, and engineers in a planning and design phase to define the scope and develop the design for the project (e.g., a new building). This phase may result in the creation of project-specific architectural plans, engineering plans, etc. These various different plans, sometimes referred to as construction drawings, generally comprise visual representations of the construction project that communicate information about the construction project, such as how to assemble or construct different parts of the project.

Following the planning and design phase, a preconstruction phase may introduce additional stakeholders such as project managers, general contractors, and subcontractors, each of whom may work with estimators to prepare cost estimates for the project based on the construction drawings. These stakeholders then use the cost estimates to prepare corresponding bids (e.g., bids to perform work on a certain portion of the project). In turn, the owner may award contracts to construct the project.

OVERVIEW

Architects and engineers typically design the various aspects of a construction project using computer-aided authoring tools that allow them to work within a real-space environment, where line segments and other shapes (e.g., walls, air ducts, pipes, etc.) within the design are drawn to scale with a structured set of geometric properties that represent their actual size. For example, a wall that is designed to be twenty feet long within the construction project will be represented by a line segment that has a length of twenty feet within the real-space environment of the computer-aided authoring tool.

However, when the design of the construction project is provided to contractors for the purpose of estimation and bidding, the construction drawings are conventionally formatted as two-dimensional (2D) image files—most commonly as PDF files (e.g., a vector image file or a raster image file). In this format, although the line segments and other shapes in the drawings maintain their relative proportions, they do not maintain their native geometric properties from the authoring tools. Rather, the 2D image file is generated at a given scale (e.g., a metric scale such as 1:50, or an imperial scale such as ¼"=1'-0") that must be referenced to determine the real-world length of a given line segment, for example.

As a result, to determine the quantity of materials and labor that will be required to construct the project, estimators and contractors must undertake the task of quantity takeoff. In general, this is a manual process that involves a human estimator using the 2D construction drawings to measure quantities for construction materials represented in the drawings. For instance, the estimator might measure the lineal feet of air duct on a set of HVAC drawings, the square footage of each room on a floor plan in order to determine the required quantity of floor tiles or carpet, and so on for each item in the construction drawings within the contractor's scope of work. Once quantities are determined, they may be added to a spreadsheet and multiplied by a unit price and/or a unit installation cost for the given material.

Still further, contractors must perform quantity takeoff not only before a given project to formulate a successful bid and win new work, but also during the life cycle of a construction project to estimate costs for change orders and the like, and for cost control purposes (e.g., by estimating the quantity of material installed vs. yet to be installed, etc.). Based on the foregoing, it will be appreciated that quantity takeoff is an extremely time-consuming process.

Some computer-implemented solutions have been developed to digitize 2D construction drawings for the purposes of quantity takeoff. For example, an estimator may import the 2D construction drawings into a visualization and measurement tool that allows the estimator to set a drawing scale (e.g., based on the given scale of the 2D drawing) and then manually trace the outline of shapes in the 2D drawing to define polygons and thereby determine their areas. Nonetheless, it will be appreciated that quantity takeoff remains a labor-intensive process that consumes a significant amount of time on every construction project.

To address the shortcomings of existing solutions to the time-consuming task of quantity takeoff, disclosed herein is new software technology that utilizes multiple image processing techniques in parallel to automatically detect areas (e.g., rooms) within 2D construction drawings, then fuses the outputs of the different techniques to arrive at a merged set of area polygons that can be used for the purpose of quantity takeoff and estimation, among other possibilities. In this way, a computing platform may use the new software technology to perform quantity takeoff and estimation accurately and in a fraction of the time it would take a human estimator, greatly increasing the efficiency of these tasks. Further, the automatic detection of areas and other objects within 2D construction drawings may facilitate various other useful applications as well, many of which will be discussed below.

As noted above, a computing platform utilizing the software technology discussed herein may receive as input a set of one or more construction drawings, such as a floor plan, each of which will generally be formatted as a 2D image file. In this regard, a given 2D image file may be a raster image (e.g., a PNG or a raster PDF) that is composed by an arrangement of individual pixels. Alternatively, the 2D image file may be a vector image (e.g., a vector PDF) that is composed by a set of instructions that detail the arrangement of nodes, lines, and curves in the 2D image. In situations where a vector image is received as input, the computing platform may read the instructions, also referred to herein as vector metadata, to create a list of vector attributes and then generate a raster image file (e.g., a PNG) that corresponds to the vector image before applying the image processing techniques discussed below.

The different image processing techniques that are utilized by a computing platform in this regard may take various forms, each of which may be applied to the 2D construction drawing(s) for which automated area detection is needed. For example, the computing platform may apply one or more image segmentation techniques that are implemented using machine-learning models that utilize convolutional neural networks (CNNs). As one possible image segmentation technique, the computing platform may apply one or more semantic segmentation models (e.g., ResNet, DeepLab) whereby each pixel in the 2D image is assigned a class label (e.g., room, wall, etc.). Thereafter, one or more post-processing steps may be applied to subdivide the overall set of commonly-classified pixels into individual areas (e.g., individual rooms). Each individual area identified in this way may be represented by a respective 2D polygon, which in turn be associated with a corresponding confidence score. In this regard, the confidence score associated with each polygon may be an output of the semantic segmentation model and may represent the confidence level (e.g., a number between 0 and 1) associated with the detection of the particular area. The computing platform may apply semantic segmentation in other manners as well.

As another possible image segmentation technique, the computing platform may apply one or more instance segmentation models (e.g., MaskRCNN) whereby the pixels in the 2D image are segregated into separate regions based on the boundaries between areas in the 2D image, without regard to any particular class label. As with semantic segmentation, the output of an instance segmentation model may be a set of 2D polygons, each with an associated confidence score that again represents the confidence level associated with the detection of the particular area by the model. The computing platform may apply instance segmentation in other manners as well.

Further, other image segmentation techniques that are based on one or more machine-learning models are also possible. These may be referred to as supervised image processing models, as the machine-learning models on which they are based rely on training datasets that included labeled (e.g., human labeled) 2D images of construction drawings.

As yet another component of the software technology discussed herein, the computing platform may apply image processing techniques that do not rely on machine-learning models for their operation. These types of techniques, which are also referred to herein as unsupervised image processing models, may instead apply rules-based algorithms that look for certain features and/or characteristics within the 2D image. For example, pixels within the 2D image that are adjacent to each other and similarly-colored (e.g., black or white), within defined tolerances, may be added as part of the same area. Other unsupervised techniques may also be used to search for particular features in a 2D image, such as doors or windows, which are generally expected to be included in association with rooms. As with the supervised models discussed above, the output of the unsupervised image processing techniques may be a set of 2D polygons representing the detected areas in the 2D image. Unlike the supervised models, however, the unsupervised image processing techniques might not yield confidence score that is associated with each detected polygon. Accordingly, a predetermined confidence score for unsupervised image processing may be assigned (e.g., 0.80, 1.0, etc.). The predetermined confidence score may be determined via testing the effectiveness of the unsupervised techniques, among other possibilities.

Various other types of unsupervised image processing techniques are also possible.

It will be appreciated that the various different techniques for detecting areas within a 2D image discussed above may perform better in some scenarios than in others. For example, instance segmentation may be relatively effective for detecting boundaries between objects, but may be less effective (e.g., may be associated with a relatively lower confidence score) when a given area or object is relatively continuous, such as a long hallway or wall. In these types of scenarios, semantic segmentation and/or unsupervised image processing might perform area detection better than instance segmentation.

For this reason, any one of the image processing techniques discussed above, if implemented in isolation, might not be reliable as a generalized solution for detecting areas across all types of construction drawings, which may include a wide range of scenarios and design layouts. Accordingly, the software technology discussed here may perform area detection on a given 2D image using multiple different image processing techniques and then fuse the results of the different techniques together to produce a merged output that is more accurate and reliable than any of the individual techniques would be alone.

The fusion of outputs from the different image processing techniques may take various forms. For example, the computing platform executing the software technology discussed herein may include a fusion module that receives the output from each of the techniques discussed above, which may include a respective set of 2D polygons, with each polygon in each set having an associated confidence score. The fusion module may then measure the degree or overlap, or coverage, between each polygon in each set with each other polygon in the other sets. In this way, the various polygons from each set may be assigned to polygon groups based on their degree of overlap The fusion module may then determine a combined confidence score for each polygon group based on the polygon(s) in the group and their respective confidence scores. In general, a polygon group that contains more polygons and/or higher individual confidence scores will result in a relatively high combined confidence score. Whereas, a polygon group with fewer assigned polygons and/or relatively lower individual confidence scores will result in a relatively lower combined confidence score.

If the combined confidence score for a given polygon group exceeds a confidence threshold value (e.g., 0.85), the fusion module may output a final polygon that is reported as a detected area within the 2D image file. In some cases, the polygon in the group with the highest individual confidence score may be reported as the final polygon. Alternatively, the fusion module may synthesize a final polygon based on the member polygons of the group. Other possibilities also exist.

When the analysis is complete, the fusion module may output a set of final polygons, also referred to herein as a set of merged polygons, that represent the areas detected within the 2D image file. Advantageously, the polygons may now be utilized as interactable regions that correspond to rooms, walls, or other objects of the 2D image file. For example, the computing platform may cause a front-end client station to display a visual representation of the 2D image file such that each polygon in the set of merged polygons is overlaid as a selectable region of the 2D image file.

In some implementations, the set of merged polygons and the source 2D image file may additionally be added as training data that is used to train the machine-learning models for one or both of the semantic segmentation and instance segmentation techniques discussed above. In this way, a feedback loop may be formed whereby the merged polygon data is used to train more accurate versions of the semantic and instance segmentation models, which may result in more accurate merged polygon data, and so on.

In line with the discussion above, the disclosed technology may be implemented as one or more software applications that facilitate quantity takeoff and estimation tasks, some examples of which may include the types of software applications developed and provided by Procore Technologies. Further, in practice, the computing platform in which the disclosed technology is incorporated may take the form of a software as a service ("SaaS") application that comprises a front-end software component running on a user's client station and a back-end software component running on a back-end computing platform that is accessible to the user client station via a communication network such as the Internet.

Accordingly, in one aspect, disclosed herein is a method that involves a computing platform (i) receiving a two-dimensional (2D) image file comprising a construction drawing, (ii) generating, via semantic segmentation, a first set of polygons corresponding to respective areas of the 2D image file, (iii) generating, via instance segmentation, a second set of polygons corresponding to respective areas of the 2D image file, (iv) generating, via unsupervised image processing, a third set of polygons corresponding to respective areas of the 2D image file, (v) based on (a) overlap between polygons in the first, second, and third sets of polygons and (b) respective confidence scores for each of the overlapping polygons, determining a set of merged polygons corresponding to respective areas of the 2D image file, and (vi) causing a client station to display a visual representation of the 2D image file wherein each merged polygon in the set of merged polygons is overlaid as a respective selectable region of the 2D image file.

In another aspect, disclosed herein is a computing platform that includes a network interface, at least one processor, a non-transitory computer-readable medium, and program instructions stored on the non-transitory computer-readable medium that are executable by the at least one processor to cause the computing platform to carry out the functions disclosed herein, including but not limited to the functions of the foregoing method.

In yet another aspect, disclosed herein is a non-transitory computer-readable storage medium provisioned with software that is executable to cause a computing platform to carry out the functions disclosed herein, including but not limited to the functions of the foregoing method.

One of ordinary skill in the art will appreciate these as well as numerous other aspects in reading the following disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example Network Configuration

As one possible implementation, this software technology may include both front-end client software running on one or more client stations that are accessible to client users of the software technology and back-end software running on a back-end platform (sometimes referred to as a "cloud" platform) that interacts with and/or drives the front-end software, and which may be operated (either directly or indirectly) by the provider of the front-end client software. As another possible implementation, this software technology may include front-end client software that runs on client stations without interaction with a back-end platform (e.g., a native software application). The software technology disclosed herein may take other forms as well.

Figure 1:
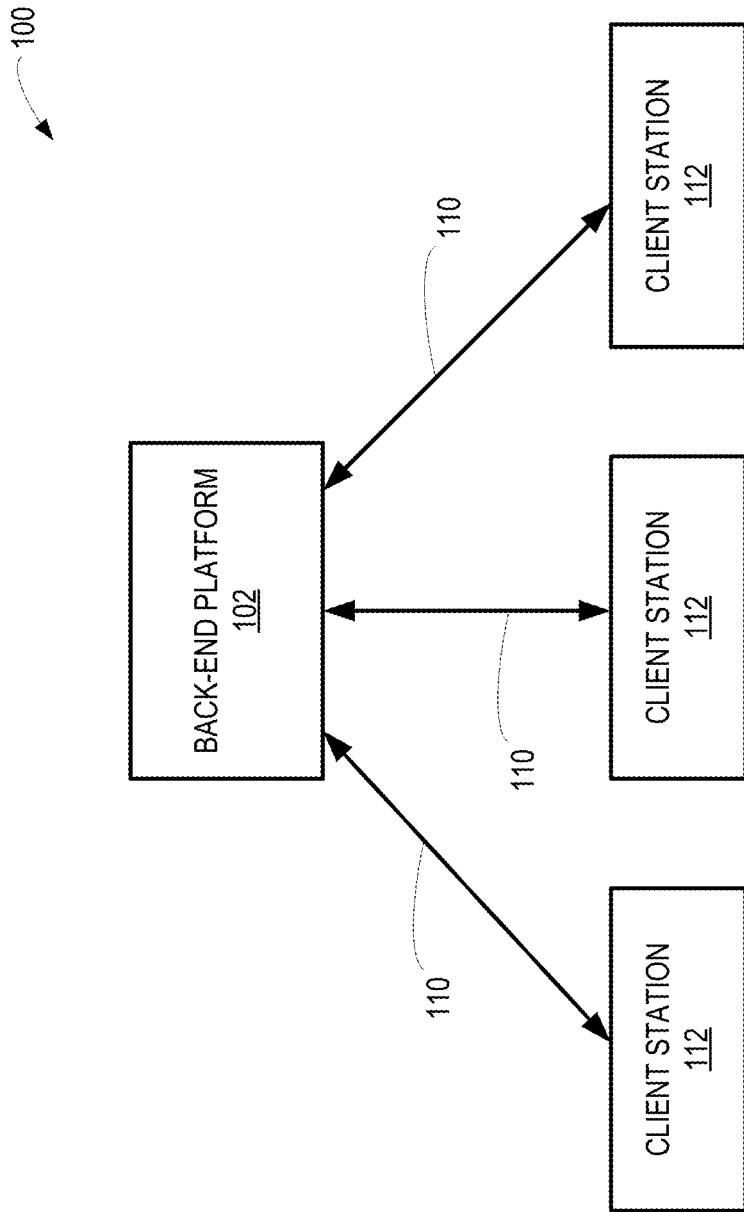
FIG. 1 depicts an example network configuration in which example embodiments may be implemented.

Turning now to the figures, FIG. 1 depicts an example network configuration 100 in which example embodiments of the present disclosure may be implemented. As shown in FIG. 1, network configuration 100 includes a back-end computing platform 102 that may be communicatively coupled to one or more client stations, depicted here, for the sake of discussion, as three client stations 112, 114, and 116.

In general, back-end computing platform 102 may comprise one or more computing systems that have been provisioned with software for carrying out one or more of the computing platform functions disclosed herein, including but not limited to functions related to outputting associated data and/or instructions that define the visual appearance of a front-end interface (e.g., a graphical user interface (GUI)) through which the data is to be presented on the one or more client stations. The one or more computing systems of back-end computing platform 102 may take various forms and be arranged in various manners.

For instance, as one possibility, back-end computing platform 102 may comprise computing infrastructure of a public, private, and/or hybrid cloud (e.g., computing and/or storage clusters) that has been provisioned with software for carrying out one or more of the computing platform functions disclosed herein. In this respect, the entity that owns and operates back-end computing platform 102 may either supply its own cloud infrastructure or may obtain the cloud infrastructure from a third-party provider of "on demand" computing resources, such as Amazon Web Services (AWS) or the like. As another possibility, back-end computing platform 102 may comprise one or more dedicated servers that have been provisioned with software for carrying out one or more of the computing platform functions disclosed herein. Other implementations of back-end computing platform 102 are possible as well.

In turn, client stations 112, 114, 116 may take any of various forms, examples of which may include a desktop computer, a laptop, a netbook, a tablet, a smartphone, and/or a personal digital assistant (PDA), among other possibilities.

As further depicted in FIG. 1, back-end computing platform 102 is configured to communicate with one or more client stations 112, 114, 116 over respective communication paths. Each communication path between back-end computing platform 102 and one of client stations 112, 114, 116 may generally comprise one or more communication networks and/or communications links, which may take any of various forms. For instance, each respective communication path with back-end computing platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with back-end computing platform 102 may be wireless, wired, or some combination thereof, and may carry data according to any of various different communication protocols. Although not shown, the respective communication paths with back-end computing platform 102 may also include one or more intermediate systems. For example, it is possible that back-end computing platform 102 may communicate with a given client station 112, 114, 116 via one or more intermediary systems, such as a host server (not shown). Many other configurations are also possible.

Although not shown in FIG. 1, back-end computing platform 102 may also be configured to receive data from one or more external data sources that may be used to facilitate functions related to the disclosed process. For example, the back-end computing platform 102 may be configured to ingest data assets from external data sources and determine location-based associations for them, similar to data assets that are generated by the front-end client stations 112, 114, 116.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. Example Computing Platform

Figure 2:
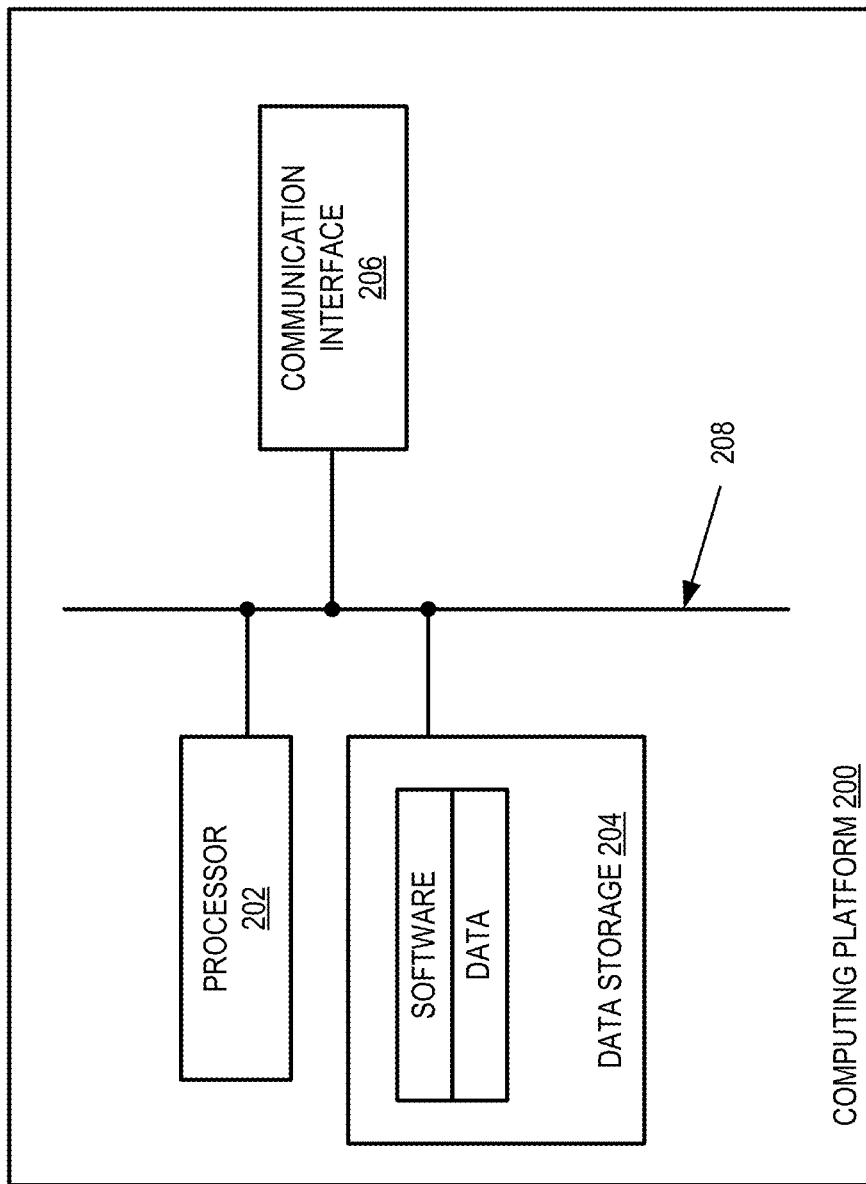
FIG. 2 depicts an example computing platform that may be configured to carry out one or more of the functions of the present disclosure.

FIG. 2 is a simplified block diagram illustrating some structural components that may be included in an example computing platform 200, which could serve as back-end computing platform 102 of FIG. 1. In line with the discussion above, platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums that are collectively configured to store (i) program instructions that are executable by processor 202 such that platform 200 is configured to perform some or all of the disclosed functions and (ii) data that may be received, derived, or otherwise stored, for example, in one or more databases, file systems, or the like, by platform 200 in connection with the disclosed functions. In this respect, the one or more non-transitory computer-readable storage mediums of data storage 204 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud. Data storage 204 may take other forms and/or store data in other manners as well.

Communication interface 206 may be configured to facilitate wireless and/or wired communication with external data sources and/or client stations, such as client stations 112, 114, 116 in FIG. 1. Additionally, in an implementation where platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a Wi-Fi network, a cellular network, a serial bus interface (e.g., Firewire, USB 3.0, etc.), a chipset and antenna adapted to facilitate wireless communication, short-range wireless protocols, and/or any other interface that provides for wireless and/or wired communication, among other possibilities. Communication interface 206 may also include multiple communication interfaces of different types. Other configurations are possible as well.

Although not shown, platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with platform 200.

It should be understood that platform 200 is one example of a computing platform that may be used with the embodiments described herein. Numerous other arrangements are possible and contemplated herein. For instance, other computing platforms may include additional components not pictured and/or more or less of the pictured components.

III. Example Functionality

As described above, the disclosed technology is generally directed to a new software technology that that utilizes multiple image processing techniques in parallel to automatically detect areas within 2D image file of a construction drawing, then fuses the outputs of the different techniques to generate a merged set of polygons that correspond to respective areas in the 2D image file.

Figure 3:
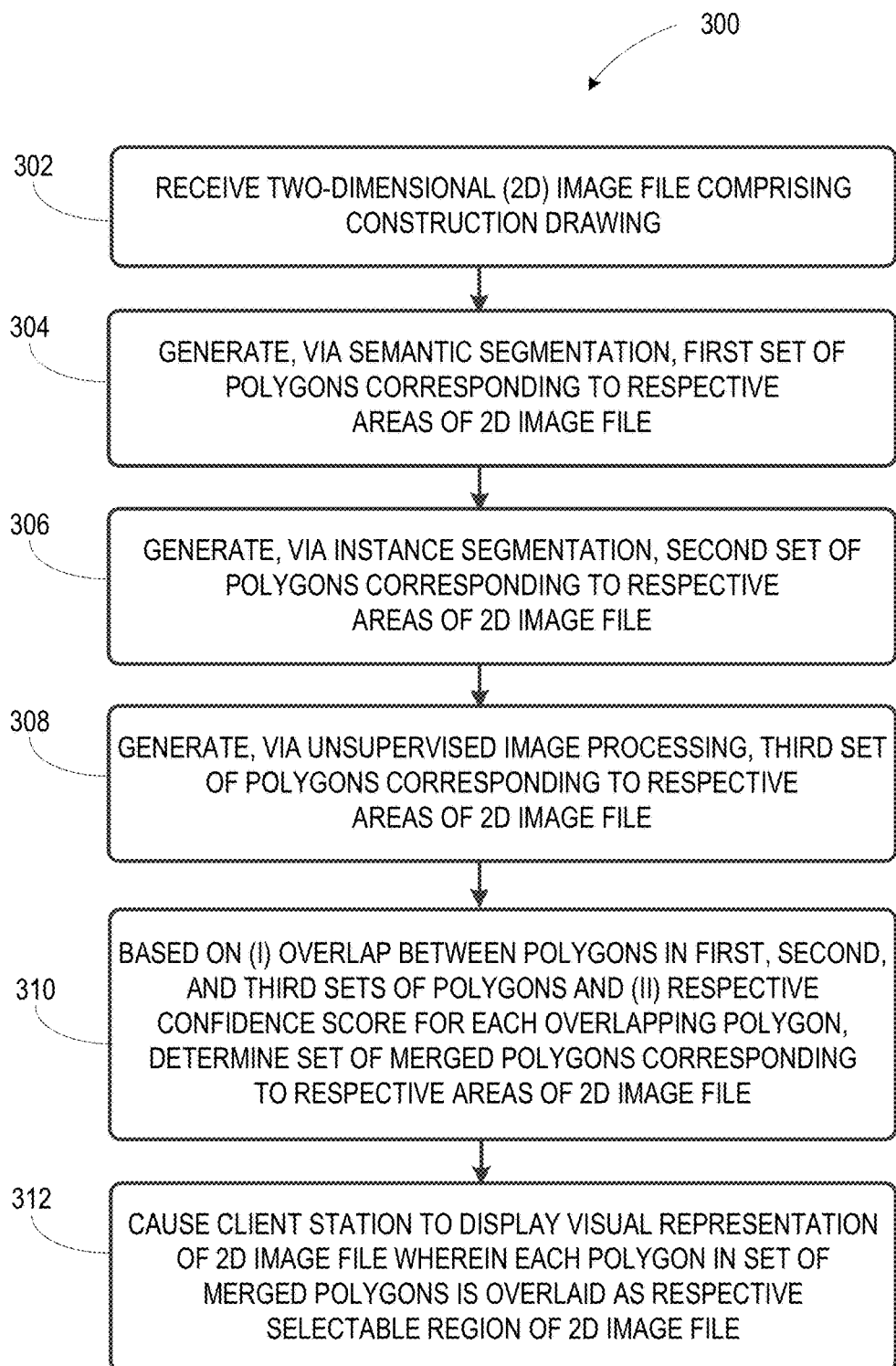
FIG. 3 depicts an example flow chart that may be carried out to facilitate automatic area detection.

Turning to FIG. 3, a flow chart 300 is shown that includes example operations that may be carried out to facilitate the automatic detection of areas in a 2D image file. The example operations will be discussed with reference to FIG. 4, which depicts a block diagram of an example computing platform 400 that may carry out the example operations. In this regard, the computing platform 400 may be similar to the back-end computing platform 102 of FIG. 1 and/or the computing platform 200 of FIG. 2.

Figure 4:
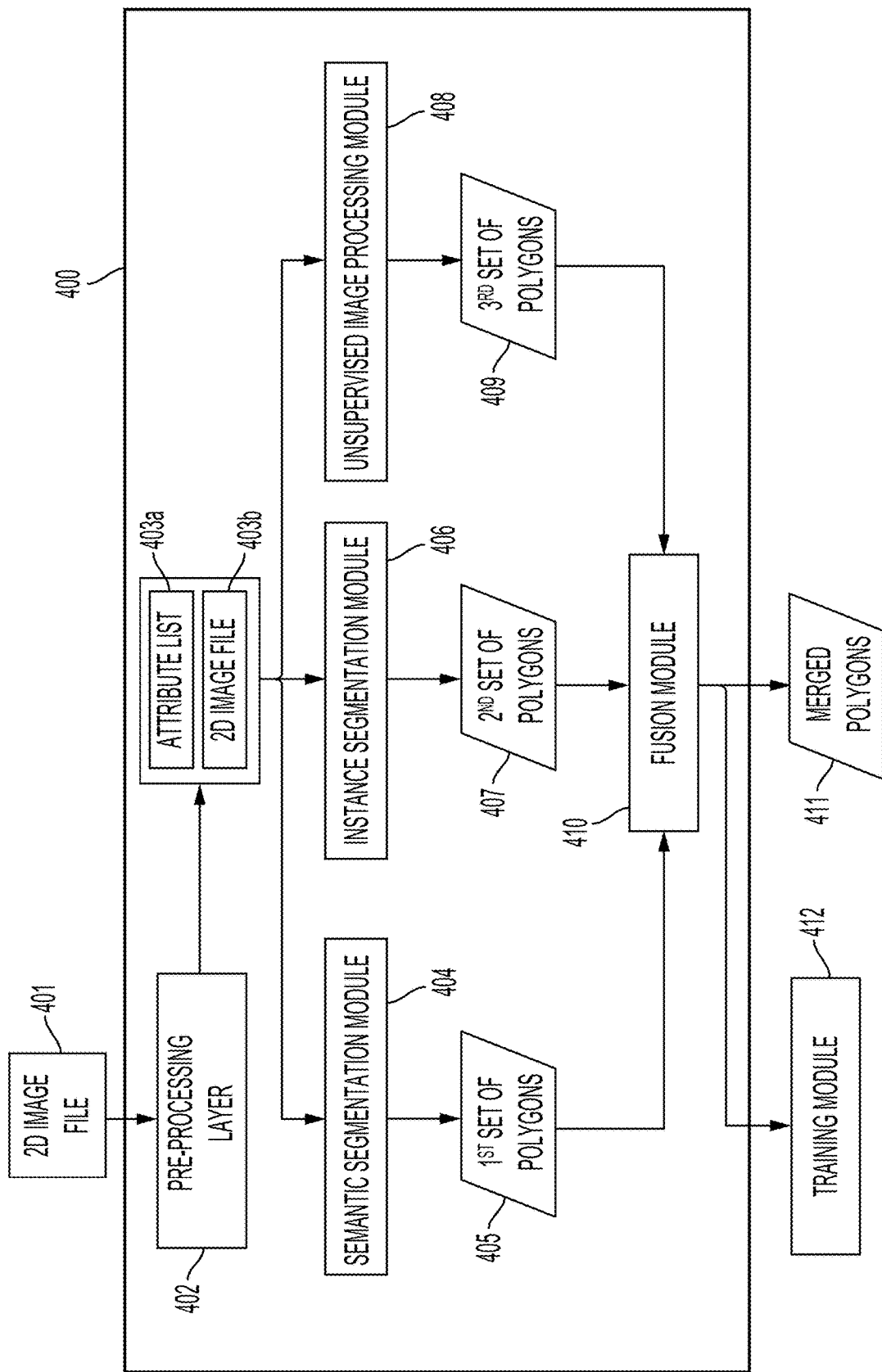
FIG. 4 depicts a simplified block diagram of a computing platform and an example data flow pipeline related to automatic area detection.

At block 302, the computing platform 400 may receive a 2D image file of a construction drawing, shown as a 2D image file 401 in FIG. 4. For example, a general contractor may receive the 2D image file as part of a set of construction drawings for a construction project on which they are bidding. The general contractor, in turn, may upload or otherwise provide the 2D image file 401 to the computing platform 400 for automatic area detection. Alternatively, the project owner, or perhaps the project engineer or architect who authored the construction drawings, may upload the 2D image file 401 to the computing platform 400, as appropriate. Other possibilities also exist.

Figure 5A:
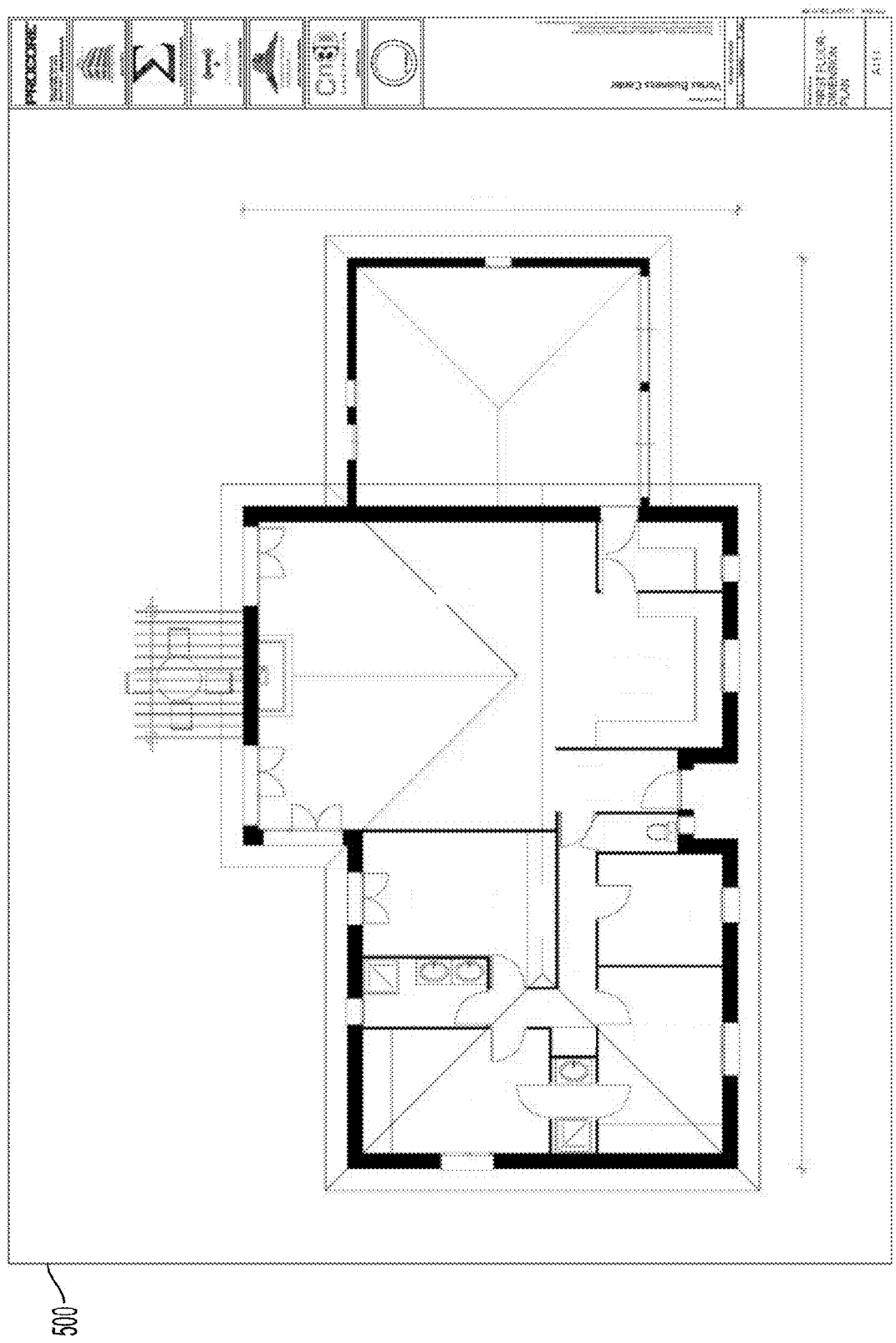
FIG. 5A depicts an example two-dimensional drawing file.

FIG. 5A illustrates one possible example of a 2D image file 500, including a typical floor plan that includes various areas corresponding to walls, rooms, hallways, and the like, as well as other typical architectural symbols such as doors and windows, etc.

Returning to FIG. 4, the 2D image file 401 received by the computing platform 400 may take various forms. In some cases, the 2D image file 401 may be a raster image, such as a PNG or JPEG file, among other possibilities. Alternatively, the 2D image file 401 may be a vector image, such as a vector PDF (e.g., a multi-page PDF for the set of construction drawings).

To handle the different types of 2D image files that may be received and to prepare the image for downstream image processing, the computing platform 400 may receive the 2D image file 401 via a pre-processing layer 402, as shown in FIG. 4. In this regard, the pre-processing layer 402 may take various forms, including one or more data ingestion tools that process and prepare the incoming 2D image file 401 for use by other components of the computing platform 400.

For example, because a vector image is not composed of pixels but rather instructions for how to draw pixels, if the received 2D image file is a vector image (e.g., a vector PDF), the computing platform 400 may read the vector metadata for the target page in the PDF (e.g., if the PDF has multiple pages) and create a vector attribute list. The computing platform 400 may then generate a raster image (e.g., a PNG) that corresponds to the vector attribute list, and which may be used more directly by the downstream image processing components. Thus, as shown in FIG. 4, the output of the pre-processing layer 402 may be an attribute list 403a and a 2D image file 403b. In this regard, the 2D image file 403b may be a rasterized version of the original vector-based 2D image file 401.

Alternatively, if the 2D image file 401 received by the computing system 400 is a PNG or a different type of raster image (e.g., a raster PDF), the pre-processing layer 402 may output only a 2D image file 403b. The 2D image file 403b in this case may be the same as the original 2D image file 401, or a version of the 2D image file 401 converted to a different raster format.

The computing platform 400 may provide the output of the pre-processing layer 402 to multiple image processing modules that will apply different image processing techniques on the 2D image file 403b. These may include image segmentation models that rely on machine-learning models, such as semantic segmentation and instance segmentation models, as well as unsupervised image processing techniques. Further, although these different image processing techniques may be depicted in FIG. 4 and generally described herein as occurring in parallel, it should be understood that the computing platform 400 might perform one or more of these techniques sequentially, or some combination thereof.

At block 304, the computing platform 400 may utilize a semantic segmentation module 404 to perform semantic segmentation on the 2D image file 403b. In this regard, the semantic segmentation module 404 may include one or more semantic segmentation models (e.g., ResNet, DeepLab) such that each pixel in the 2D image file 403b is assigned a class label. In some examples, the semantic segmentation module 404 may be trained to make a binary class label decision for each pixel. For instance, each pixel in the 2D image file 403b may be assigned a class label of either "Room" or "Not Room." In some other examples, the semantic segmentation module 404 may be trained to assign labels for multiple different classes of object that may be included in a given construction drawings, such as rooms, walls, windows, doors, air ducts, pipes, etc.

The initial output of a semantic segmentation procedure may be a 2D image that includes a map of the class labels for each pixel. Thus, the semantic segmentation module 404 may additionally apply one or more post-processing steps to further segment the pixels of a given class, such as a Room class, into separate areas (e.g., separate rooms). This post-processing of the initial semantic segmentation output may take various forms. As one possibility, one or more rules-based algorithms may predict boundaries between pixels in a Room class based on the geometric relationship of the pixels (e.g., pixel connectivity). As another possibility, the location of pixels of a different class (e.g., Walls) may be used as an indication of a boundary between areas. As yet another possibility, the semantic segmentation module 404 may incorporate data from other sources within the overall image processing pipeline. For instance, the semantic segmentation module 404 may use information in the attribute list 403a, if available, to predict boundaries between areas. Still further, the semantic segmentation module 404 may predict the location of some boundaries based on boundaries that are predicted by the instance segmentation module 406, which will be discussed further below. Numerous other examples are also possible, including combinations of the above.

Semantic segmentation post-processing may involve other functions as well. For example, after boundaries between areas are estimated and an initial set of polygons is created, the semantic segmentation module 404 may be configured to discard any polygons that are not larger than a predefined size threshold. Further, the semantic segmentation module 404 may identify and remove any duplicate polygons (e.g., using a non maximum suppression function) that overlap with another polygon in the set by more than a threshold amount. In these situations, the polygon with the lower confidence score may be discarded. Various other post-processing functions are also possible.

As a result of these post-processing steps, the computing platform 400 may generate a first set of 2D polygons 405 corresponding to respective areas of the 2D image file. Further, each polygon in the first set of polygons 405 will have a confidence score that is generally represented as a number between 0 and 1. The confidence score for a given polygon may be a value that is output from the one or more semantic segmentation models and/or post-processing techniques that were used, and may represent the confidence associated with the assignment of a class label to one or more of the pixels in the area, and/or the predicted location of a boundary of the polygon, among other factors.

Figure 5B:
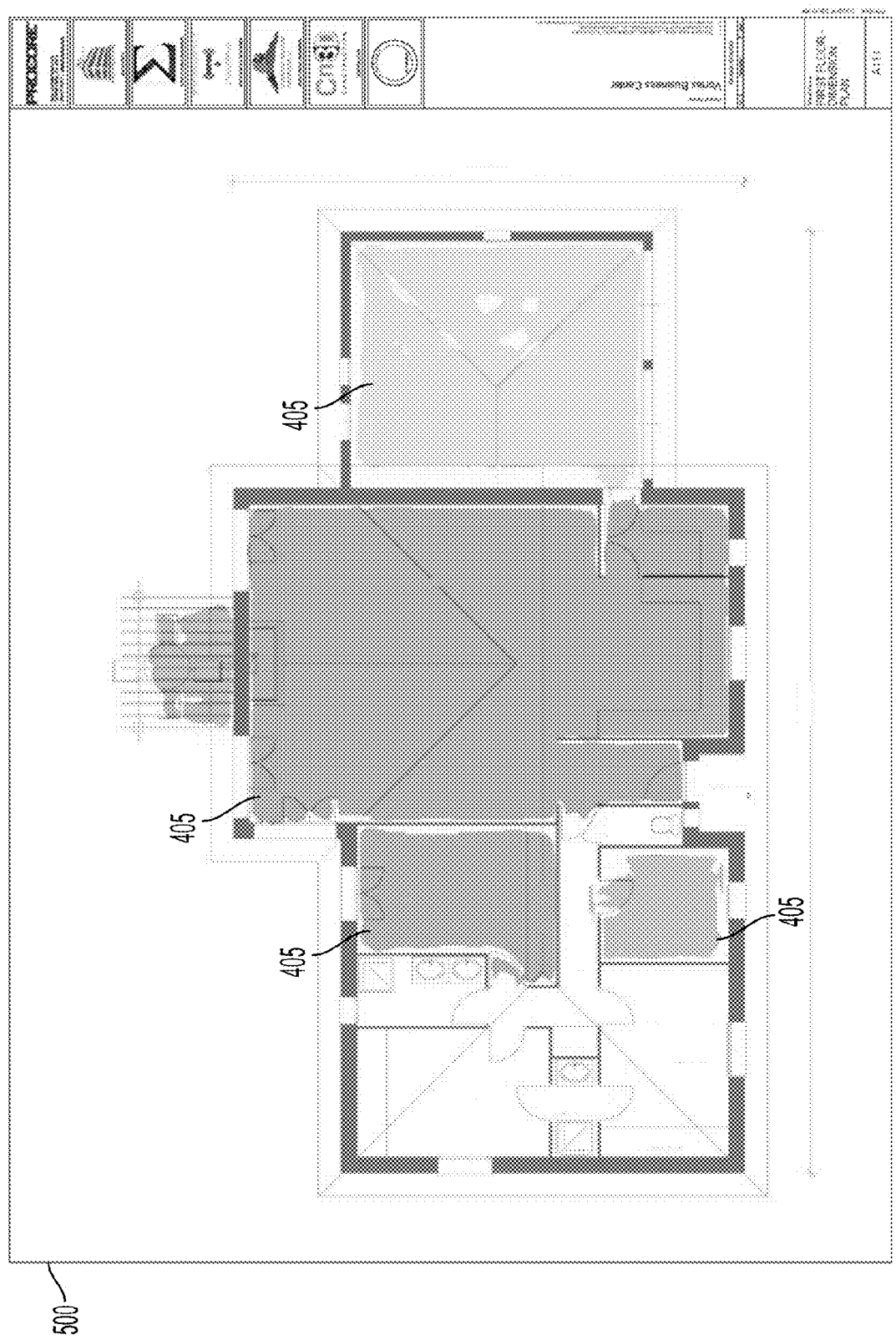
FIG. 5B depicts a simplified illustration of an example of area detection using semantic segmentation on the 2D drawings file shown in FIG. 5A.

FIG. 5B illustrates an example of semantic segmentation applied to the example 2D image file 500 shown in FIG. 5A. As can be seen in FIG. 5B, the 2D image file 500 includes various polygons 405 that represent the results of the semantic segmentation operation, including a post-processing step to estimate boundaries between different rooms.

Returning to the flow chart 300, at block 306, the computing platform 400 may utilize an instance segmentation module 406 to perform instance segmentation on the 2D image file 403b. In this regard, the instance segmentation module 406 may include one or more instance segmentation models (e.g., MaskRCNN) that divide the pixels in the 2D image file 403b into separate areas based on the boundaries detected between objects in the 2D image. These separate areas may form an initial set of polygons on which the instance segmentation module 406 may perform various post-processing functions.

For example, similar to the semantic segmentation module 404, the instance segmentation module 406 may discard any of the initial polygons that are not larger than a pre-defined size threshold, which may be the same size threshold or a different size threshold than the one used in the semantic segmentation post-processing. Further, the instance segmentation module 406 may remove any duplicate polygons that it detected, as discussed above. Various other post-processing functions are also possible.

As a result of these post-processing steps, the computing platform 400 may generate a second set of 2D polygons 407 corresponding to respective areas of the 2D image file 403b. As above, each polygon in the second set of polygons 407 will have a confidence score between 0 and 1 that is output from the one or more instance segmentation models and/or post-processing techniques that were used and represents the confidence level associated with the detection of the particular area by the instance segmentation model(s).

Figure 5C:
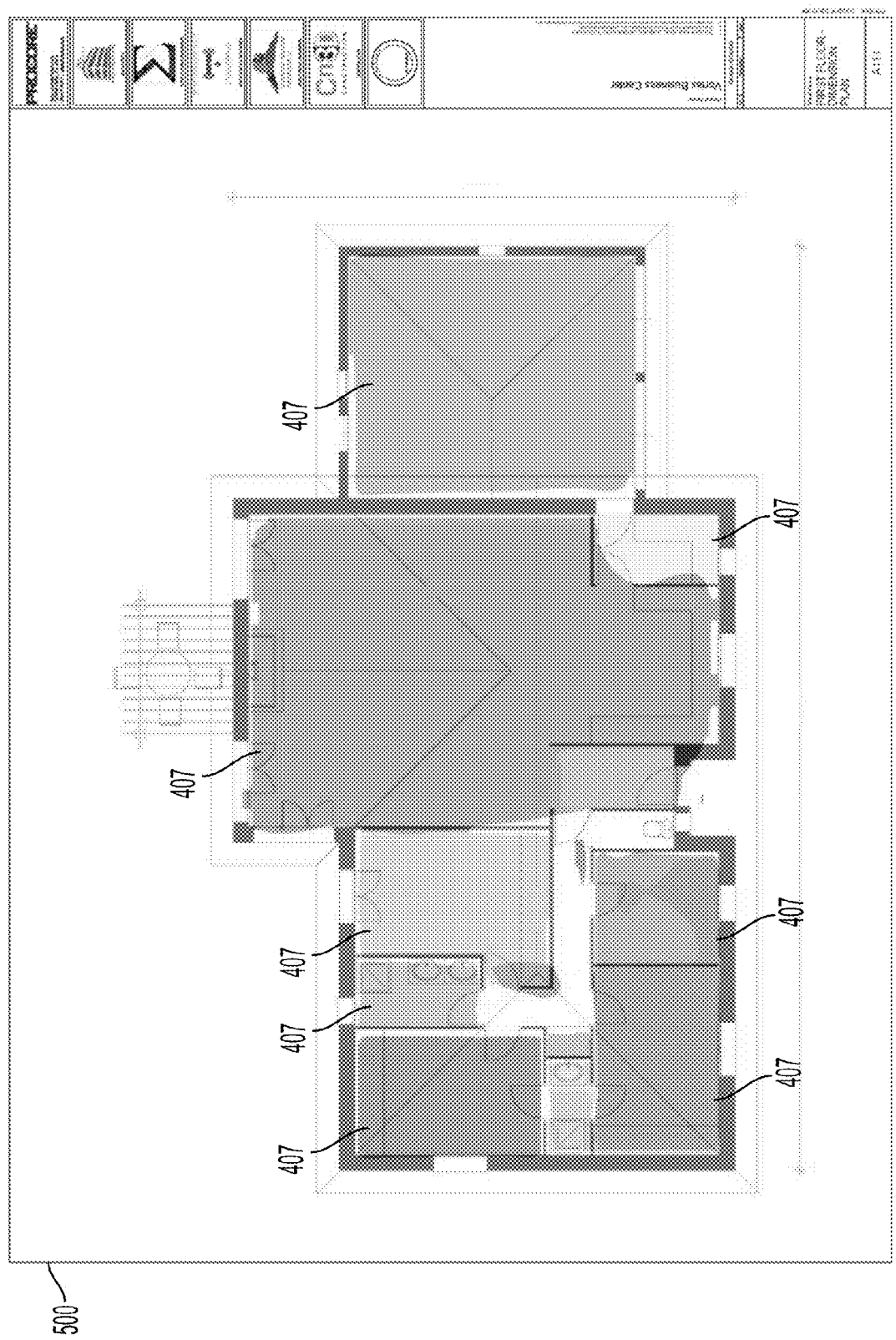
FIG. 5C depicts a simplified illustration of an example of area detection using instance segmentation on the 2D drawings file shown in FIG. 5A.

FIG. 5C illustrates an example of instance segmentation applied to the same 2D image file 500 that is shown in FIGS. 5A-5B. As can be seen in FIG. 5C, the 2D image file 500 includes various polygons 407 that represent the results of the instance segmentation operation.

Returning again to the flow chart 300, at block 308 the computing platform 400 may utilize an unsupervised image processing module 408 to generate a third set of polygons corresponding to respective areas of the 2D image file 403b. As noted above, the unsupervised image processing module 408 may employ various rules-based algorithms to detect areas in the 2D image file 403b, unlike the supervised segmentation operations that rely on machine-learning models and associated training data.

The unsupervised image processing may take various forms. In some implementations, one or more filtering operations may be initially applied that attempt to remove information from the 2D image file 403b that is not necessary for area detection, and thus may act as noise for area detection operations. For instance, in addition to the floor plan of interest, a typical 2D construction drawing may include various textual information, legends, design specifications, title blocks, etc. Accordingly, the unsupervised image processing module 408 may filter (e.g., hide) these types of information from later operations by applying one or more masks to the 2D image file 403b, among other possibilities. Other types of filtering operations are also possible.

The unsupervised image processing module 408 may then undertake one or more area detection operations. As one possibility, a flood fill algorithm may be applied that recursively compares pixels in multiple directions in order to group connected and similarly-colored pixels into respective areas that are represented by polygons. In some cases, a tolerance parameter for similarity in pixel color (e.g., a threshold RGB difference) may be used to determine whether two connected pixels should be grouped into the same area, which may be helpful in situations where the source 2D image file 403b is not strictly black and white. Further, like the segmentation modules discussed above, the unsupervised image processing module 408 may discard polygons that do not meet a threshold size, which may be the same threshold or a different threshold than those used by the other modules.

Further, the unsupervised image processing module 408 may employ one or more feature matching techniques (e.g., FLANN, SIFT) to identify specific features within the 2D image file 403b that are represented by standard architectural symbols, such as doors. Indeed, doors are frequently expected to be found in association with rooms, and thus the identification and location of doors within the 2D image file 403b may inform the detection of such areas. Additionally or alternatively, image processing techniques that detect circular objects (e.g., a circle Hough transform) within a 2D image may be used to identify the arc portion of a standard door symbol, and thus may be used as a proxy for identifying doors.

The unsupervised image processing module 408 may apply numerous other types of image processing operations such as dilation, erosion, hole filling, etc., in addition or as alternatives to those discussed above. Further, the unsupervised image processing module 408 may incorporate information from the attribute list 403a, if available, as an additional input to facilitate some or all of these types of image processing operations.

Based on the unsupervised image processing discussed above, the computing platform 400 may generate a third set of 2D polygons 409 corresponding to respective areas of the 2D image file 403b. As above, each polygon in the third set of polygons 407 may have an associated confidence score. However, unlike the supervised segmentation models, the unsupervised image processing may not output a confidence score for each detected area as part of the detection operation. Accordingly, each polygon in the third set of polygons 409 may be assigned the same confidence score, such as a confidence score of 1. In some cases, this value may be adjusted based on the performance of the unsupervised image processing module 408, as appropriate.

Figure 5D:
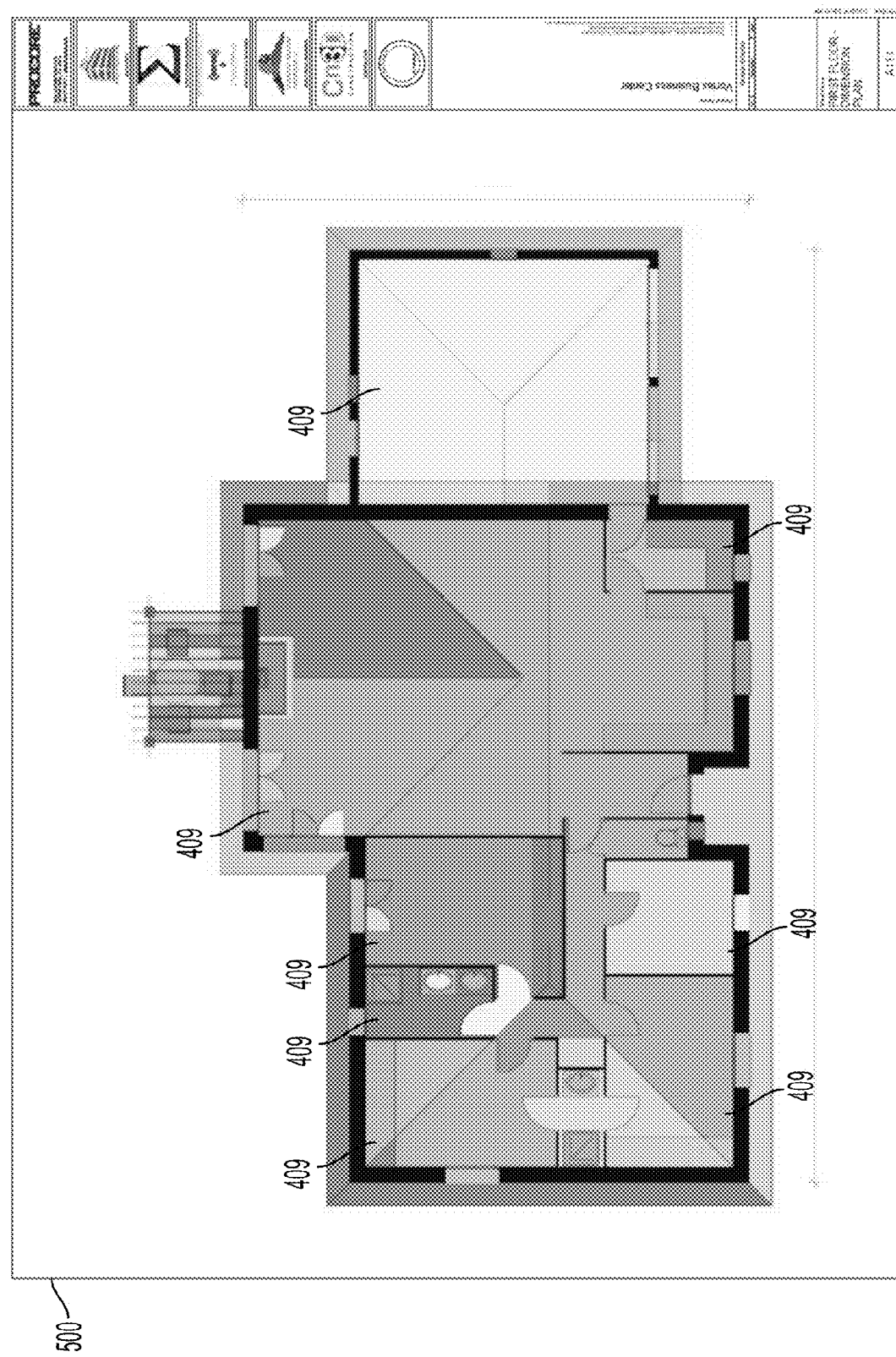
FIG. 5D depicts a simplified illustration of an example of area detection using unsupervised image processing on the 2D drawings file shown in FIG. 5A.

FIG. 5D illustrates an example of unsupervised image processing applied to the same 2D image file 500 that is shown in FIGS. 5A-5C. As can be seen in FIG. 5D, the 2D image file 500 includes various polygons 409 that represent the results of the unsupervised image processing operation.

While the examples above generally involve three different types of image processing modules that are used by the computing platform 400 for area detection, this is just one possible implementation. Other examples in line with the discussion herein may involve more or fewer image processing modules of different types.

As discussed above, each of the three area detection modules shown in FIG. 4 will output a different area detection result that includes a set of polygons and associated confidence scores for each polygon. Using these results, the computing platform 400 may, at block 310 of the flow chart 300, determine a set of merged polygons corresponding to respective areas of the 2D image file based on the overlap between polygons in the first, second, and third sets of polygons and the respective confidence scores for each of the overlapping polygons. In this regard, the computing platform 400 may include a fusion module 410, as shown in FIG. 4, that may compare and combine the results from the different detection modules to find the detected areas with the highest confidence. These operations may take various forms.

For example, the fusion module 410 may first check that each polygon from each set of polygons meets a minimum size threshold, in addition to or as an alternative to the individual detection modules applying this check as a post-processing operation, as discussed above. Indeed, in some implementations, some or all of the operations undertaken by the fusion module 410 may be combined with the post-processing operations from the individual area detection modules.

As a next step, the fusion module 410 may compare each polygon from each set of polygons to every polygon from the other two sets to determine the degree of coverage between the polygons. For example, if the first set of polygons 405 includes polygons $A_1, A_2 \ldots A_N$, the second set of polygons 407 includes polygons $B_1, B_2 \ldots B_N$, and the third set of polygons 409 includes polygons $C_1, C_2 \ldots C_N$, the fusion module 410 may compare polygon pairs $(A_1, B_1)$, then $(A_1, B_2)$, up to $(A_1, B_N)$, then move on to $(A_1, C_1)$, then $(A_1, C_2)$, up to $(A_1, C_N)$, and so on, until every possible pair of polygons from different sets is compared.

The comparison may involve an intersection over union (IoU) check to determine degree of overlap between the polygons. If the IoU of two polygons is larger than a coverage threshold (e.g., 80%), it may be indicative that the two polygons are representative of the same area in the 2D image file 403b, as detected by the two different modules. Thus, the two polygons from the different sets may be assigned to the same polygon group. In this way, at the conclusion of the pairwise comparison of polygons from different sets, each polygon group that is determined by the fusion module 410 may contain a minimum one polygon (e.g., if no polygon from a different set had sufficient overlap) and a maximum of three polygons (e.g., if one polygon from each set had sufficient mutual overlap).

As discussed above, each polygon will have an associated confidence score. Based on these individual confidence scores, the fusion module 410 may determine a combined confidence score for each polygon group based its member polygons. In this regard, a combined confidence score may be determined in various ways, including a weighted summation of the confidence scores for all polygons in the group, among other possibilities. One possible equation for determining a combined confidence score for a given polygon group is provided below:

$$\text{Combined\_Score} = W_{IS} \times \text{Conf\_Score}_{IS} + W_{SS} \times \text{Conf\_Score}_{SS} + W_{UIP} \times \text{Conf\_Score}_{UIP}$$

The variable W for each term in the equation may represent a relative weight that is assigned to the respective polygons from each of the detection modules. The value of the weight for each term may be determined in various ways. For instance, it may be determined through observation and testing that the instance segmentation module 406 is generally performing better (e.g., more accurately predicting areas) than the other two detection modules. Thus, it may be desirable to give greater weight to the polygons that are detected by the instance segmentation module 406 than polygons that are detected by the other two modules. Accordingly, the weight variable $W_{IS}$ may have a value of 0.50, while the weight variables $W_{SS}$ for semantic segmentation and $W_{UIP}$ for unsupervised image processing may each have a value of 0.25. Other example values are also possible.

Further, the values assigned to the weight variables may be adjusted as appropriate. For example, the outputs from each of the detection modules may be compared against human labeled training data, which may be used to iteratively adjust the values in a multi-object optimization process, among other possibilities.

Although the equation above includes a term for each of the three detection modules shown in FIG. 4, some polygon groups may not include a polygon from one or more of the sets of polygons, in which case the corresponding term would not be included. Accordingly, it will be appreciated based on the equation above that a polygon group that contains multiple polygons (e.g., a polygon from each detection module) that each have a relatively high individual confidence score will result in a relatively high combined confidence score. Whereas, a polygon group with fewer assigned polygons (e.g., from only one of the detection modules) and/or polygons with relatively lower confidence scores will result in a relatively lower combined confidence score.

Once a combined confidence score for a given polygon group has been determined, it may be compared to a confidence threshold (e.g., 0.85). If the combined score exceeds the threshold, the fusion module 410 may output a final polygon that is reported as a detected area within the 2D image file. In this regard, the geometry of the final polygon may be determined in various ways. As one possibility, the member polygon in the group with the highest individual confidence score may be reported as the final polygon. In many cases, this may correspond to a polygon obtained from the unsupervised image processing technique, if present in the polygon group. As another possibility, the fusion module may synthesize a final polygon based on the member polygons of the group. For example, the fusion module 410 may determine a best-fit polygon from the members, perhaps incorporating the respective weight variables from the equation above (or a different set of weight variables) as part of the best-fit analysis. Other possibilities also exist.

The polygons output by the fusion module 410 may constitute a set of merged polygons 411, as shown in FIG. 4, that represent the detected areas in the 2D image file 401.

Figure 5E:
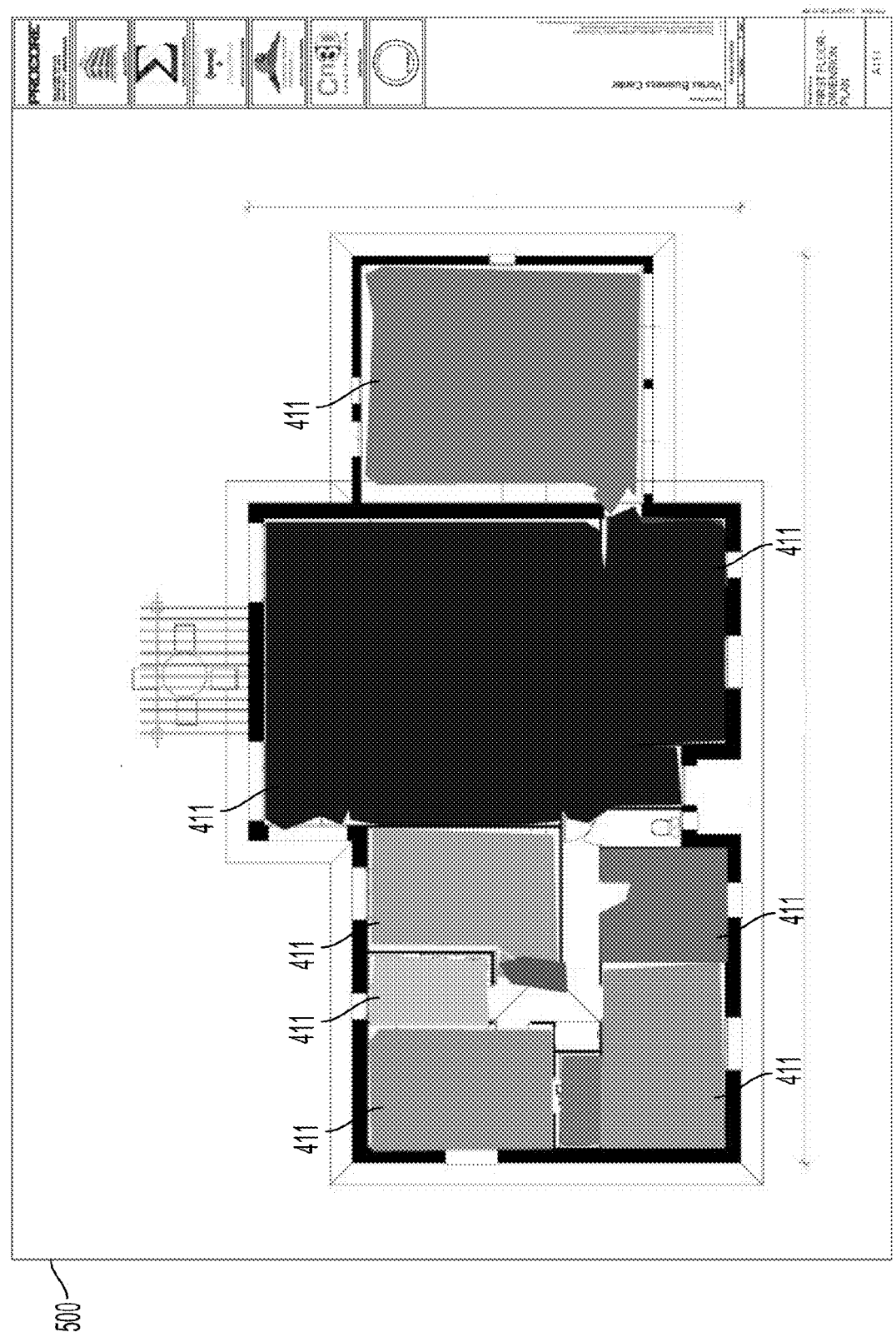
FIG. 5E depicts a simplified illustration of an example of the fusion of the area detection techniques shown in FIGS. 5B-5D.

FIG. 5E illustrates an example of the merged polygons that may be determined for the 2D image file 500 shown in FIGS. 5A-5D, based on a fusion of the three sets of polygons shown in those figures. As can be seen in FIG. 5E, the 2D image file 500 includes various merged polygons 411, many of which correspond to respective polygons 405, polygons 407, and polygons 409 from different image processing modules that exhibit a high degree of overlap, as discussed above. Advantageously, the merged set of polygons 411 shown in FIG. 5E may now be utilized as interactable regions of the 2D image file 401.

Returning to the flow chart 300, at block 312 the computing platform 400 may cause a client station to display a visual representation of the 2D image file 401, where each merged polygon in the set of merged polygons 411 is overlaid as a respective selectable region of the 2D image file 401. In this regard, the client station may be one of the client stations 112 shown in FIG. 1, which in turn may correspond to a computing device that is being used to perform quantity takeoff and estimation for the construction drawing shown in the 2D image file 401, among other tasks.

For example, if a user wishes to know the area of a given room, the user may mouse-over or otherwise indicate the room on the 2D image file, which may highlight the polygon corresponding to the room. Selecting the polygon may cause the area of the polygon, and thus the area of the room, to be displayed.

Figure 6:
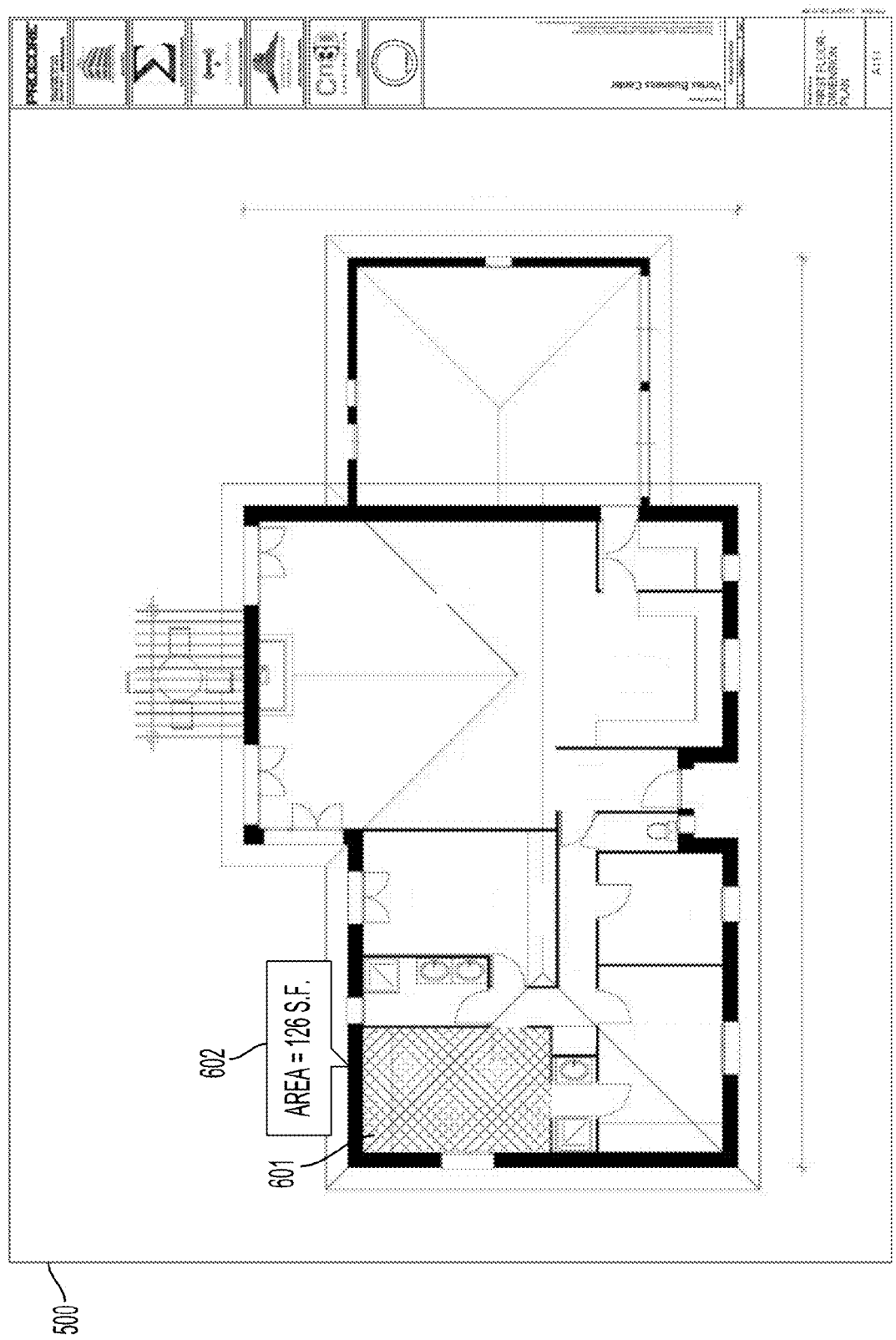
FIG. 6 depicts an example view of the 2D drawing file shown in FIGS. 5A-5E with an automatically detected area selected.

Such an example is shown in FIG. 6, which illustrates the 2D image file 500 from FIGS. 5A-5E after the set of merged polygons 411 has been overlaid. In FIG. 6, a user has selected one of the polygons 411 that corresponds to a room 601, which has caused the polygon to become highlighted (e.g., while the other merged polygons 411 remain hidden or transparent). Further, an area callout 602 is now displayed on the 2D image file and conveys the area of the polygon 411 and thus the room 601. In a similar way, multiple rooms and/or other objects may be selected in groups for purposes of quantity takeoff and estimation, which may greatly reduce the time that is currently devoted to such tasks in the construction industry. In this regard, the display of a given 2D image file in conjunction with the merged polygons representing rooms and other areas may be implemented in any number of front end applications, such as estimating tools, statusing tools, viewing tools, and the like.

In addition to the computing platform 400 using the set of merged polygons 411 for the quantification of areas, we well as other possible applications discussed below, the final output of the fusion module 410 may also be provided to a training module 412. In FIG. 4, the training module 412 is depicted as separate from the computing platform 400, although in some implementations it may be a part of the computing platform 400. The training module 412 may use the output from the fusion module 410 in various ways. For example, the 2D image file 401 and the set of merged polygons 411 may be annotated and split into training and validation data sets, which may then be merged with existing training and validation data sets. The merged training data may be used to train one or both of the semantic segmentation and instance segmentation models, which may then be evaluated against the merged validation data sets. If the accuracy of the model(s) improves, the new version of the model may be deployed, which may lead to improved area detection and more accurate polygons, and so on. More sets of merged polygons may be fed back to the training module 412, creating a feedback loop for improving the performance of area detection operations discussed herein.

As noted above, the image processing techniques contemplated herein can be beneficial for directly determining material and labor quantities for purposes of quantity takeoff on a 2D image file of a construction drawing. For example, a polygon corresponding to a room will have an area that corresponds to the area of a room. As another example, if objects such as a doors or electrical receptacles are identified in the 2D drawing using these image processing techniques, their number may also be quantified directly from these operations. In addition, these types of image processing techniques may also facilitate indirect quantification of material and labor in various ways. For instance, the length of a wall or walls that are detected in the 2D image file may be multiplied by the height of the room to determine the square footage of painting that is needed. As another possibility, the number and location of electrical receptacles may be used to estimate a length of electrical wire that is needed, which is often not specified on electrical drawings and must be determined manually. Numerous other types of direct and indirect material and labor quantification may be enabled in similar ways.

Additionally, in addition to determined the area of a given room in the 2D image file, the image processing techniques herein may also be used to predict the application, or use, of a given area (e.g., a kitchen, a utility room, a garage, etc.) based on the size, shape, relative location, and/or features detected within the area (e.g., text, windows, doors, sinks, furniture, etc.), among other factors. This may enable further automation of the estimating process, as knowing the type of application of a given room may imply the material finishes or other material specifications that will be used, such that these may not need to be manually selected during quantity takeoff and estimation.

As another possible application, the image processing techniques discussed herein may allow for some degree of quality assurance and/or quality control. For example, if an area is detected that is likely to be a room, but does not have a door or other apparent opening associated with it, the computing platform 400 may generate a flag or similar notification that a door may be missing from the architectural design. Further, rooms having a particular application (e.g., a kitchen) may be associated with certain design requirements (e.g., a minimum wall thickness for fire protection) that may be measured and verified through these techniques. Thus, if a room is predicted to have a particular application, but the image processing techniques indicate that it may be lacking one or more design features required for that applications, the computing platform 400 may flag it as a potential issue, as above.

As yet another possible application, because the merged polygons that are determined above are associated with a room that has a particular location within a 2D construction drawing, and thus within the overall construction project, the individual rooms may be added as data assets in a location-based construction knowledge graph. An example of such a location-based construction knowledge graph is described in U.S. application Ser. No. 17/307,869, which is incorporated by reference herein in its entirety. Once added to such a knowledge graph, each room may be linked to other data assets that are associated with the room, such as progress photos taken within the room, RFIs, responsible stakeholders, a project schedule, etc., making each of these data assets more accessible.

In general, many of the beneficial applications of the image processing techniques discussed herein involve adding structured data to a 2D image file that can be used to more easily interpret the 2D image file. In some cases, this information may be layered onto the 2D image file such that a user can select what data is displayed (e.g., detected areas, material quantities, quality assurance alerts, associated photos, etc). Thus, it may be appreciated that a 2D image file that is subjected to these image processing techniques may begin to resemble the more data-rich files (e.g., CAD files) that were used by the architects and engineers to generate the 2D construction drawings in the first place. Accordingly, an eventual extension of the image processing techniques discussed herein may be to generate a two-dimensional or three-dimensional model (e.g., a building information model) based on a fusion of some or all of the construction drawings for a given construction project. In this regard, a three-dimensional model may incorporate 2D elevation drawings that include the height of various areas.

Numerous other applications of the image processing techniques discussed herein are also possible.

IV. Conclusion

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users," or other entities, this is for purposes of example and explanation only. Claims should not be construed as requiring action by such actors unless explicitly recited in claim language.

The invention claimed is:

1. A computing platform comprising:
   a network interface;
   at least one processor;
   non-transitory computer-readable medium; and
   program instructions stored on the non-transitory computer-readable medium that are executable by the at least one processor such that the computing platform is configured to:
      receive a two-dimensional (2D) image file comprising a construction drawing;
      generate, via semantic segmentation, (i) a first set of polygons corresponding to respective areas of the 2D image file and (ii) a respective confidence score for each polygon in the first set of polygons;
      generate, via instance segmentation, (i) a second set of polygons corresponding to respective areas of the 2D image file and (ii) a respective confidence score for each polygon in the second set of polygons;
      generate, via unsupervised image processing, (i) a third set of polygons corresponding to respective areas of the 2D image file and (ii) a respective confidence score for each polygon in the third set of polygons;
      for each polygon from each set of polygons, determine a respective overlap with each polygon from the other sets of polygons;
      based on (i) the determined overlap between polygons and (ii) the respective confidence scores for each of the overlapping polygons, determine a set of merged polygons corresponding to respective areas of the 2D image file; and
      cause a client station to display a visual representation of the 2D image file, wherein each merged polygon in the set of merged polygons is overlaid as a respective selectable region of the 2D image file.

2. The computing platform of claim 1, further comprising program instructions stored on the non-transitory computer-readable medium that are executable by the at least one processor such that the computing platform is configured to:
   determine that the 2D image file comprises a vector image;
   extract vector metadata from the 2D image file, wherein the vector metadata comprises an attribute list; and
   generate a raster image of the 2D image file, wherein the semantic segmentation, instance segmentation, and unsupervised image processing are each applied to the raster image of the 2D image file.

3. The computing platform of claim 2, wherein the program instructions that are executable by the at least one processor such that the computing platform is configured to generate, via unsupervised image processing, the third set of polygons comprise program instructions that are executable by the at least one processor such that the computing platform is configured to:
   generate, via unsupervised image processing, the third set of polygons based on the attribute list.

4. The computing platform of claim 1, further comprising program instructions stored on the non-transitory computer-readable medium that are executable by the at least one processor such that the computing platform is configured to:
   for each determined overlap between two polygons that exceeds a coverage threshold, assign the two polygons to a respective polygon group, wherein each polygon group comprises up to one polygon from each of the first, second, and third sets of polygons; and
   for each polygon group, determine a combined confidence score for the polygon group based on a respective individual confidence score of each polygon in the polygon group.

5. The computing platform of claim 4, wherein the program instructions that are executable by the at least one processor such that the computing platform is configured to, for each polygon group, determine the combined confidence score for the polygon group comprise program instructions that are executable by the at least one processor such that the computing platform is configured to:
   apply a respective weight variable to each polygon in the polygon group, wherein the respective weight variable is applied based on whether the polygon was generated by semantic segmentation, instance segmentation, or unsupervised image processing.

6. The computing platform of claim 4, wherein the program instructions that are executable by the at least one processor such that the computing platform is configured to determine the set of merged polygons comprise program instructions that are executable by the at least one processor such that the computing platform is configured to:
   determine that the combined confidence score from a given polygon group exceeds a confidence threshold; and
   based on the polygons within the given polygon group, determine a merged polygon to be added to the set of merged polygons.

7. The computing platform of claim 6, wherein the program instructions that are executable by the at least one processor such that the computing platform is configured to determine, based on the polygons within the given polygon group, the merged polygon to be added to the set of merged polygons comprise program instructions that are executable by the at least one processor such that the computing platform is configured to:
   select, as the merged polygon, the polygon from the polygon group having a highest individual confidence score.

8. The computing platform of claim 6, wherein the program instructions that are executable by the at least one processor such that the computing platform is configured to determine, based on the polygons within the given polygon group, the merged polygon to be added to the set of merged polygons comprise program instructions that are executable by the at least one processor such that the computing platform is configured to:
   synthesize the merged polygon based on the polygons within the given polygon group.

9. The computing platform of claim 1, further comprising program instructions stored on the non-transitory computer-readable medium that are executable by the at least one processor such that the computing platform is configured to:

before determining, for each polygon from each set of polygons, the respective overlap with each polygon from the other sets of polygons, discard all polygons from the first, second, and third sets of polygons that do not meet a minimum size threshold.

10. A non-transitory computer-readable medium, wherein the non-transitory computer-readable medium is provisioned with program instructions that, when executed by at least one processor, cause a computing platform to:

receive a two-dimensional (2D) image file comprising a construction drawing;

generate, via semantic segmentation, (i) a first set of polygons corresponding to respective areas of the 2D image file and (ii) a respective confidence score for each polygon in the first set of polygons;

generate, via instance segmentation, (i) a second set of polygons corresponding to respective areas of the 2D image file and (ii) a respective confidence score for each polygon in the second set of polygons;

generate, via unsupervised image processing, (i) a third set of polygons corresponding to respective areas of the 2D image file and (ii) a respective confidence score for each polygon in the third set of polygons;

for each polygon from each set of polygons, determine a respective overlap with each polygon from the other sets of polygons;

based on (i) the determined overlap between polygons and (ii) the respective confidence scores for each of the overlapping polygons, determine a set of merged polygons corresponding to respective areas of the 2D image file; and cause a client station to display a visual representation of the 2D image file, wherein each merged polygon in the set of merged polygons is overlaid as a respective selectable region of the 2D image file.

11. The non-transitory computer-readable medium of claim 10, wherein the non-transitory computer-readable medium is also provisioned with program instructions that, when executed by at least one processor, cause the computing platform to:

determine that the 2D image file comprises a vector image;

extract vector metadata from the 2D image file, wherein the vector metadata comprises an attribute list; and generate a raster image of the 2D image file, wherein the semantic segmentation, instance segmentation, and unsupervised image processing are each applied to the raster image of the 2D image file.

12. The non-transitory computer-readable medium of claim 11, wherein the program instructions that, when executed by at least one processor, cause the computing platform to generate, via unsupervised image processing, the third set of polygons comprise program instructions that, when executed by at least one processor, cause the computing platform to:

generate, via unsupervised image processing, the third set of polygons based on the attribute list.

13. The non-transitory computer-readable medium of claim 10, wherein the non-transitory computer-readable medium is also provisioned with program instructions that, when executed by at least one processor, cause the computing platform to:

for each determined overlap between two polygons that exceeds a coverage threshold, assign the two polygons to a respective polygon group, wherein each polygon group comprises up to one polygon from each of the first, second, and third sets of polygons; and for each polygon group, determine a combined confidence score for the polygon group based on a respective individual confidence score of each polygon in the polygon group.

14. The non-transitory computer-readable medium of claim 13, wherein the program instructions that, when executed by at least one processor, cause the computing platform to, for each polygon group, determine the combined confidence score for the polygon group comprise program instructions that, when executed by at least one processor, cause the computing platform to:

apply a respective weight variable to each polygon in the polygon group, wherein the respective weight variable is applied based on whether the polygon was generated by semantic segmentation, instance segmentation, or unsupervised image processing.

15. The non-transitory computer-readable medium of claim 13, wherein the program instructions that, when executed by at least one processor, cause the computing platform to determine the set of merged polygons comprise program instructions that, when executed by at least one processor, cause the computing platform to:

determine that the combined confidence score from a given polygon group exceeds a confidence threshold; and based on the polygons within the given polygon group, determine a merged polygon to be added to the set of merged polygons.

16. The non-transitory computer-readable medium of claim 15, wherein the program instructions that, when executed by at least one processor, cause the computing platform to determine, based on the polygons within the given polygon group, the merged polygon to be added to the set of merged polygons comprise program instructions that, when executed by at least one processor, cause the computing platform to:

select, as the merged polygon, the polygon from the polygon group having a highest individual confidence score.

17. The non-transitory computer-readable medium of claim 15, wherein the program instructions that, when executed by at least one processor, cause the computing platform to determine, based on the polygons within the given polygon group, the merged polygon to be added to the set of merged polygons comprise program instructions that, when executed by at least one processor, cause the computing platform to:

synthesize the merged polygon based on the polygons within the given polygon group.

18. The non-transitory computer-readable medium of claim 10, wherein the non-transitory computer-readable medium is also provisioned with program instructions that, when executed by at least one processor, cause the computing platform to:

before determining, for each polygon from each set of polygons, the respective overlap with each polygon from the other sets of polygons, discard all polygons from the first, second, and third sets of polygons that do not meet a minimum size threshold.

19. A method carried out by a computing platform, the method comprising:

receiving a two-dimensional (2D) image file comprising a construction drawing;

generating, via semantic segmentation, (i) a first set of polygons corresponding to respective areas of the 2D image file and (ii) a respective confidence score for each polygon in the first set of polygons;

generating, via instance segmentation, (i) a second set of polygons corresponding to respective areas of the 2D image file and (ii) a respective confidence score for each polygon in the second set of polygons;

generating, via unsupervised image processing, (i) a third set of polygons corresponding to respective areas of the 2D image file and (ii) a respective confidence score for each polygon in the third set of polygons;

for each polygon from each set of polygons, determining a respective overlap with each polygon from the other sets of polygons;

based on (i) the determined overlap between polygons and (ii) the respective confidence scores for each of the overlapping polygons, determining a set of merged polygons corresponding to respective areas of the 2D image file; and causing a client station to display a visual representation of the 2D image file, wherein each merged polygon in the set of merged polygons is overlaid as a respective selectable region of the 2D image file.

20. The method of claim 19, further comprising:

for each determined overlap between two polygons that exceeds a coverage threshold, assigning the two polygons to a respective polygon group, wherein each polygon group comprises up to one polygon from each of the first, second, and third sets of polygons; and for each polygon group, determining a combined confidence score for the polygon group based on a respective individual confidence score of each polygon in the polygon group.

* * * * *

UNITED STATES PATENT AND TRADEMARK OFFICE
CERTIFICATE OF CORRECTION

| | | |
|---|---|---|
| PATENT NO. | : 11,900,515 B2 | Page 1 of 1 |
| APPLICATION NO. | : 17/883555 | |
| DATED | : February 13, 2024 | |
| INVENTOR(S) | : Soltani et al. | |

It is certified that error appears in the above-identified patent and that said Letters Patent is hereby corrected as shown below:

On the Title Page

Item (72), Lines 3-4, replace:
Azadeh Yazdanpanah, Richmond Hill (CA)
With:
Azadeh Yazdan Panah Gohar Rizi, Richmond Hill (CA)

Signed and Sealed this
Twenty-fifth Day of March, 2025

Coke Morgan Stewart
*Acting Director of the United States Patent and Trademark Office*